(12) United States Patent
Ghobrial et al.

(10) Patent No.: US 6,438,156 B1
(45) Date of Patent: Aug. 20, 2002

(54) STEPWISE ADAPTIVE FINITE IMPULSE RESPONSE FILTER FOR SPREAD SPECTRUM RADIO

(75) Inventors: Ayman K. Ghobrial, Huntsville; Steven R. Blackwell, Madison, both of AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/248,664

(22) Filed: Feb. 11, 1999

(51) Int. Cl.[7] ................................................ H04L 27/01
(52) U.S. Cl. ..................... 375/148; 375/233; 375/350
(58) Field of Search .................................. 375/130, 140, 375/147, 148, 229, 232, 233, 350; 708/319, 322, 323

(56) References Cited

U.S. PATENT DOCUMENTS

| | | | |
|---|---|---|---|
| 4,852,090 A | 7/1989 | Borth | 370/104 |
| 5,164,959 A | 11/1992 | Cai et al | 375/1 |
| 5,359,624 A | 10/1994 | Lee et al | 375/1 |
| 5,416,799 A | 5/1995 | Currivan et al | 375/14 |
| 5,481,564 A * | 1/1996 | Kakuishi et al | 375/230 |
| 5,550,810 A | 8/1996 | Monogioudis et al | 370/18 |
| 5,692,006 A * | 11/1997 | Ross | 37/200 |
| 5,757,853 A | 5/1998 | Tsujimoto | 375/200 |
| 5,805,480 A | 9/1998 | Greenberg | 364/724.19 |
| 6,240,133 B1 * | 5/2001 | Sommer et al | 375/232 |

\* cited by examiner

*Primary Examiner*—Amanda T. Le
(74) *Attorney, Agent, or Firm*—Allen, Dyer, Doppelt, Milbrath & Gilchrist, P.A.

(57) ABSTRACT

A distortion compensation filtering mechanism for a direct spread-spectrum radio receiver comprises an iteratively adaptive FIR filter installed in the received signal processing path of the radio just upstream of the despreading function. The filter may be implemented as a relatively small numbered tap filter, having its precursor tap fixed at a maximum value. The remaining filter tap values are individually adaptively adjusted by the radio's control processor, which executes a tap adjustment routine to iteratively increment or decrement each variable tap value of the FIR filter to an 'optimized' value, that effectively minimizes the total (I and Q) power in the error in the data decisions performed by data signal analyzer.

13 Claims, 2 Drawing Sheets

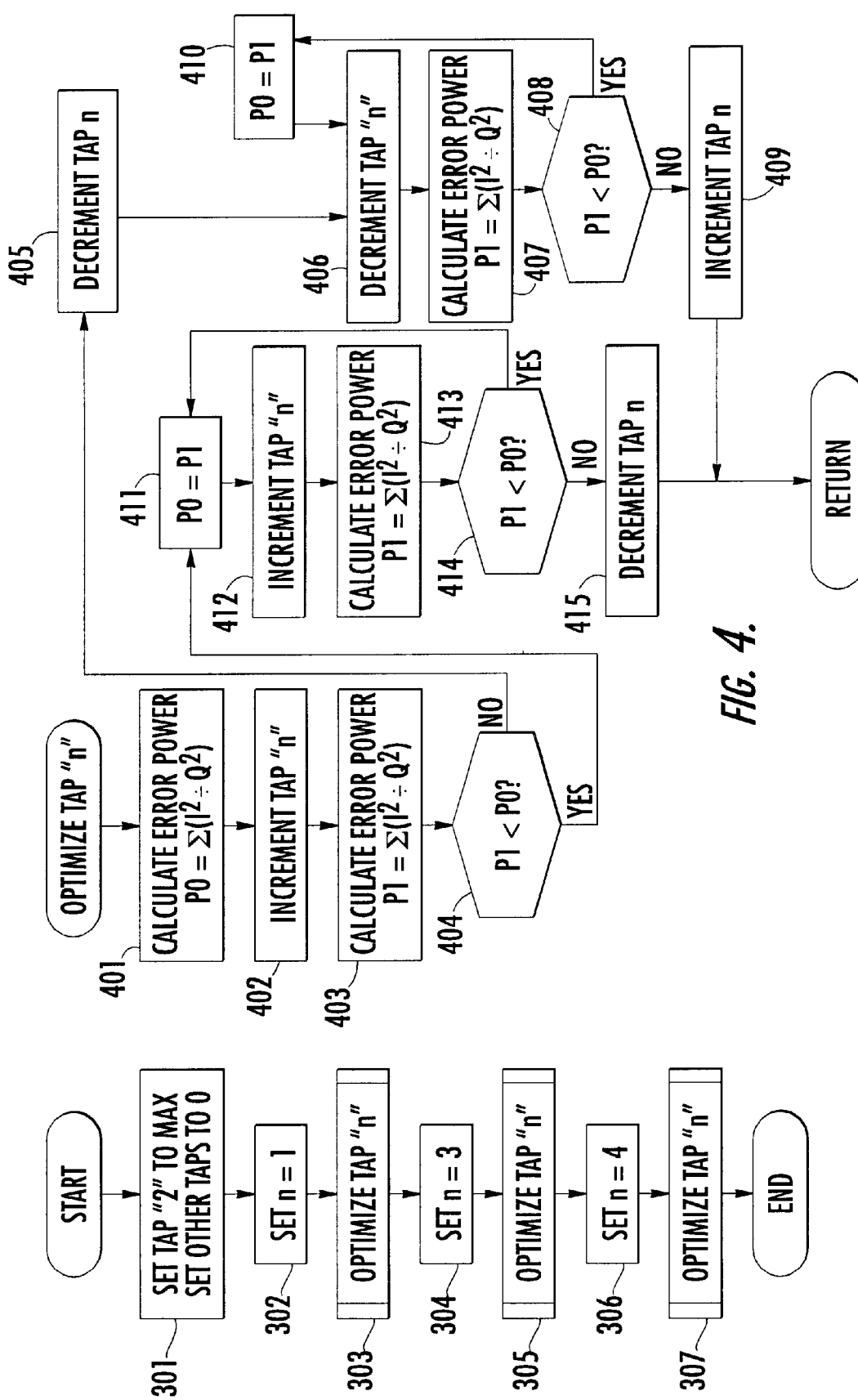

STEPWISE ADAPTIVE FINITE IMPULSE RESPONSE FILTER FOR SPREAD SPECTRUM RADIO

FIELD OF THE INVENTION

The present invention relates in general to communication systems and is particularly directed to a reduced complexity adaptive finite impulse response (FIR) filter for a direct spread spectrum radio, that compensates for the inability of a fixed equalization filter to accommodate changes in the characteristics of the radio due to temperature, aging or other effects.

BACKGROUND OF THE INVENTION

In order to be competitive, wireless telecommunication service providers who offer data transmission services to business and consumer customers by way of direct spread-spectrum systems have found it necessary to employ low cost (reduced complexity) radio circuit designs. (For a non-limiting example of literature detailing direct sequence spread-spectrum systems, attention may be directed to the text entitled: "Coherent Spread Spectrum Systems," by J. K. Holmes, John Wiley & Sons, 1982, and the text entitled: "Spread Spectrum Systems with Commercial Applications (Third Edition)," by R. C. Dickson, John Wiley & Sons, 1994.)

The performance of these radios is influenced by two major sources of signal degradation—random noise, and internal distortion. The first source—random noise—is injected into the radio channel, and ultimately limits the performance and range of the radio. The second—signal distortion—results from filtering and modulation artifacts inherent in the radio.

In order to compensate for these signal degradation sources, low cost direct spreading radio circuits may contain equalization filters, whose characteristics are fixed by design, or tuned to match each radio at the time of production. Even though fixed equalization filters reduce hardware complexity and cost, over time they limit the performance of the radio, as they cannot dynamically track changes in operational characteristics of the radio due to temperature, aging or other effects.

SUMMARY OF THE INVENTION

In accordance with the present invention, the above described performance limitations of conventional commercial grade, direct spread-spectrum radios are effectively obviated by inserting a reduced complexity, stepwise or iteratively adaptive FIR filter in the received signal processing path of the radio just upstream of the despreading function. As will be described, in a non-limiting, but preferred embodiment, this adaptive filter may be implemented as a relatively small numbered (e.g., four) tap FIR filter, having its cursor tap (center tap) fixed at a (maximum) value of $2^{b-1}-1$, where b is the number of bits per tap weighting coefficient (e.g., eight).

The remaining tap values of the filter are individually adaptively adjusted, as necessary, by the radio's control processor, which monitors the error or offset in the data values produced by a data signal analyzer (e.g., bit slicer). In particular, the control processor executes a tap adjustment routine in which it iteratively increments or decrements each variable tap value of the FIR filter to an 'optimized' value that effectively minimizes the total (I and Q) power in the error in the data decisions performed by data signal analyzer.

BRIEF DESCRIPTION OF THE DRAWINGS

FIG. 3 is a flow chart of an iterative tap adjustment routine executed by the control processor of the spread spectrum radio receiver section of FIG. 2; and FIG. 4 shows the steps of the tap optimization routine executed by the control processor of the spread spectrum radio receiver section of FIG. 2 in the course of the iterative tap adjustment routine of FIG. 3.

DETAILED DESCRIPTION

Figure 1:
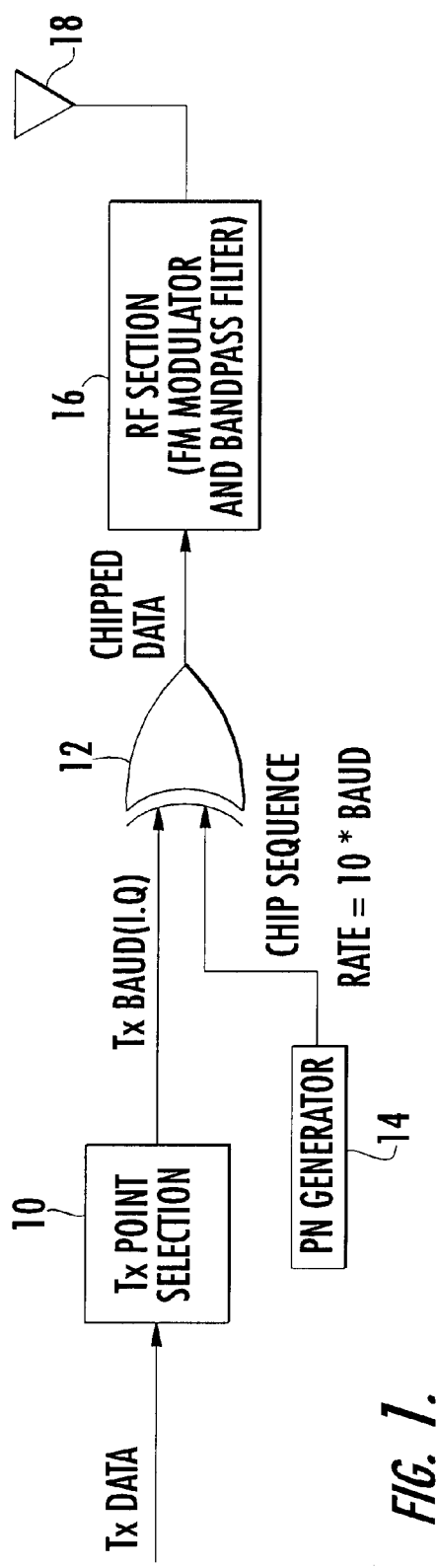
FIG. 1 diagrammatically illustrates the transmit section of a typical spread spectrum radio.

Before describing in detail the new and improved stepwise adaptive, FIR filter for a spread spectrum radio in accordance with the present invention, it should be observed that the invention resides primarily in what is effectively a prescribed arrangement of conventional communication circuits and associated digital signal processing components and attendant supervisory control circuitry therefor, that controls the operations of such circuits and components. Consequently, the configuration of such circuits components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of a direct spread-spectrum radio in a convenient functional grouping, whereby the present invention may be more readily understood.

FIG. 1 diagrammatically illustrates the transmit section of a typical direct spread-spectrum radio, the receiver section of which is to be modified to incorporate the iteratively adaptive FIR filter of the present invention, to be described with reference to FIGS. 2–4. In the transmit (Tx) section of the radio, the respective bits of an incoming digital data stream Tx Data are encoded by a transmit constellation mapping unit 10 to produce a dual in-phase and quadrature (I,Q) channel Tx Baud signal that is to be spread and transmitted. For this purpose, via an exclusive-OR circuit 12, the Tx Baud signal is modulated by a pseudo-random chip sequence produced by a pseudo random noise (PN) generator 14, the output of which is a 'spread' or 'chipped' data stream having a prescribed number of chips (e.g., ten) per baud. The chip sequence produced by the exclusive-OR circuit 12 is coupled to the radio's RF section 16, which includes an FM modulator and bandpass filter, and the resulting spread, FM-modulated RF carrier produced by RF section 16 is transmitted via an antenna 18.

Figure 2:
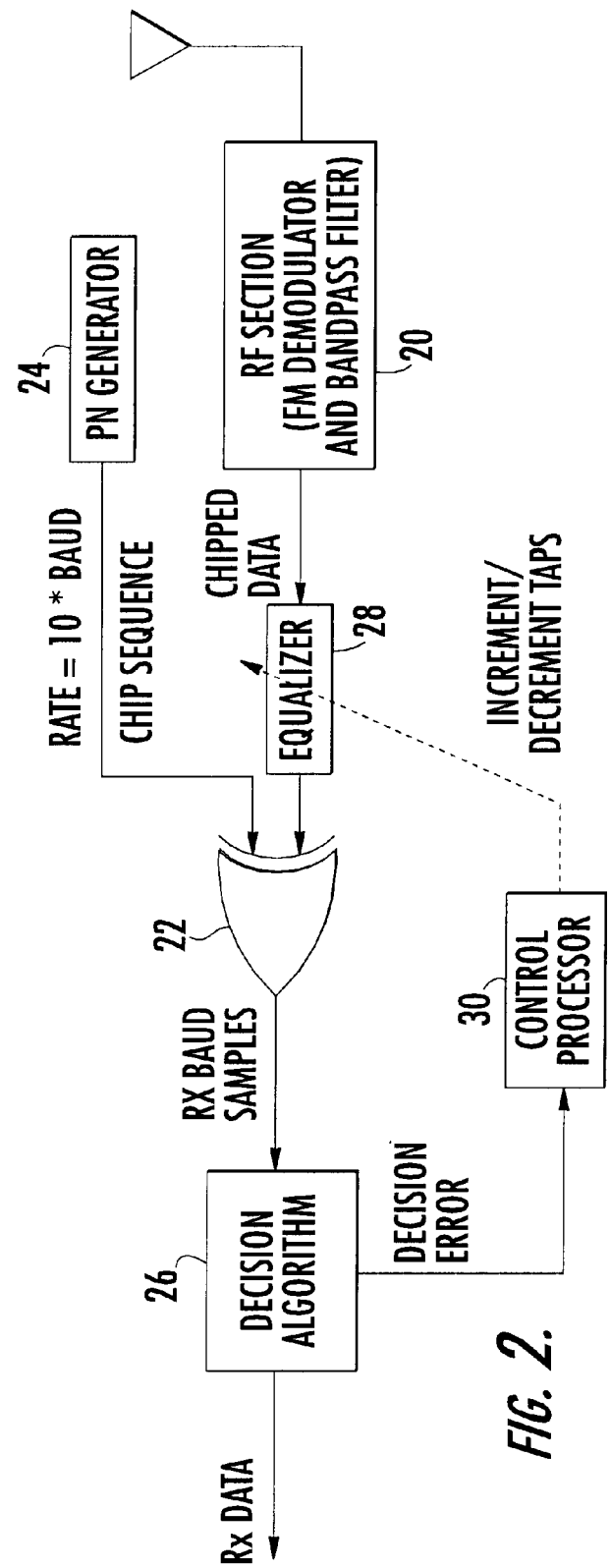
FIG. 2 diagrammatically illustrates the receiver section of a spread spectrum radio which incorporates the iteratively adaptive FIR filter of the present invention.

The radio's receiver (Rx) section is diagrammatically illustrated in FIG. 2 as comprising an RF receive section 20, which FM-demodulates and bandpass filters a signal received from another (remote) direct spreading radio, and outputs a received chip sequence that is to be 'despread' by an exclusive-OR circuit 22. For this purpose, exclusive-OR circuit 22 is coupled to receive a despreading, pseudo-random chip sequence produced by a pseudo random noise (PN) generator 24, which matches the spreading sequence employed by the remote transmitting radio. The despread Rx Baud signals produced by exclusive-OR circuit 22 are then processed by a data signal analyzer or decision stage 26, which is typically implemented as a bit slicer, to recover the data bits of the Rx Data.

As described briefly above, because the fixed transfer functions of a fixed equalization filter would be unable to dynamically track changes in the operational characteristics of the spread-spectrum radio due to temperature, aging or other effects, errors would be introduced into the despread signal seen by the data signal analyzer and thereby the recovered Rx data. Pursuant to the invention, this problem is successfully addressed by the insertion of an iteratively adjusted, adaptive multi-tap FIR filter 28 in the received signal path between the output of the RF receiver section 20 and the despreading exclusive-OR circuit 22. The adjustable filter 28 is inserted upstream of the despreading operation (exclusive-OR circuit 22), since the despreading function is a nonlinear operation.

In a non-limiting, but preferred embodiment, filter 28 may be implemented as an n=4 tap FIR filter, having its cursor tap (here the second tap (n=2)) fixed at a (maximum) value of $2^{b-1}-1$, where b is the number of bits per tap weighting coefficient (e.g., eight). As shown in the receiver section diagram of FIG. 2, and as will be detailed below with reference to the flow charts of FIGS. 3 and 4, the respective n=1, 3 and 4 tap values of the filter 28 are individually adaptively adjusted, as necessary, by the radio's control processor 30, which monitors the error or offset in the data values produced by the data signal analyzer 26. It should be observed that the filter is not limited to one having four or any other number of taps; nor is the code resolution of a tap weight value limited to eight or any other number of bits. These parameters are given as practical examples for a cost competitive commercial implementation. It has been found that with such parameters, the invention is able to provide a one to three dB improvement in performance (error reduction), without a significant cost penalty.

In particular, the radio's control processor 30 iteratively adjusts each variable tap value of the FIR filter 28, so as to adaptively optimize each adjustable tap to a value which minimizes the total (I and Q) power in the error in the data decisions performed by data signal analyzer 26. A non-limiting, but preferred embodiment of the iterative tap adjustment algorithm executed by control processor 30 for adaptively controlling the parameters of the FIR filter 28 will now be described with reference to FIGS. 3 and 4.

As described above, and as shown at step 301 in the flow chart of FIG. 3, at the beginning of the tap adjustment routine, the values of each of the filter's adjustable taps (taps 1, 2 and 4 in the present example) are initially set to zero, and its cursor tap (tap 2) is fixed at a (maximum) value of $2^{b-1}-1$. The routine then transitions to step 302, which identifies the number of the tap to be adjusted (the first tap (n=1)), and then transitions to the tap "n" optimization step 303, the steps of which are shown in FIG. 4.

At the start of the tap optimization routine of FIG. 4, with the tap weighting coefficient value currently set to zero (i.e., in the present example of b=8, the tap value of the first tap (n=1) is initially set at 00000000), in step 401, the total power $(P_e = \Sigma(I_e^2 + Q_e^2))$ in the error in the data decision operation performed by the data signal analyzer 26 is calculated and stored as an error power value P0. Next, in step 402, the tap value is incremented (e.g., by adding a value of '1' to the least significant bit (LSB) position to increment the tap value to 00000001).

Next, in step 403, with the tap value incremented, the total power $(P_e = \Sigma(I_e^2 + Q_e^2))$ in the error in the data decision operation performed by the data signal analyzer 26 is again calculated and set as an error power value P1. In query step 404, this new error power value P1 is compared with the stored error power value P0. If P1<P0 (the answer to query step 404 is NO), which implies that increasing the tap value does not reduce the error, the routine transitions to step 405, wherein the value of the tap is decremented to its immediately previous value (e.g., by subtracting a value of '1' from the least significant bit (LSB) position of the tap value). Since increasing the tap value in step 402 did not improve performance (decrease the error), the routine proceeds to decrease the tap value in decrement step 406, and then recalculates the error power in step 407 to derive a new value of error power P1.

Next, just as in the earlier query step 404, this newly calculated error power value P1 is compared in query step 408 with the stored error power value P0. If P1<P0 (the answer to query step 408 is NO, which implies that decreasing the tap value does not reduce the error), the routine transitions to step 409, wherein the value of the tap is incremented back to its immediately previous value. Since neither incrementing nor decrementing the value of the tap has provided a reduction in error power, it is concluded that no further modification of the tap value will provide a performance improvement, so that the current value of the tap is effectively 'optimized'. The tap optimization routine then exits to the next tap of the routine of FIG. 3, here step 304.

However, if the answer to query step 408 is YES, which implies that decreasing the tap value reduces the error), the routine transitions to step 410, wherein the newly calculated error power value P1 is stored in place of the previously stored error power value P0, and the routine loops back to decrement step 406, described above. Eventually, once further decrementing of the tap value no longer produces a reduction in error power (i.e., the answer to query step 408 is NO), the tap value is incremented in step 409 to its previous (optimized) value and the tap optimization routine exits to the next tap of the routine of FIG. 3.

If the answer to query step 404, described above, is YES, which implies that increasing the tap value reduces the error, the routine transitions to step 411, wherein the newly calculated error power value P1 is stored in place of the previously stored error power value P0, and the value of the tap is further incremented in step 412. Next, in query step 413, with the tap value further incremented, the total power $(P_e = \Sigma(I_e^2 + Q_e^2))$ in the error in the data decision operation performed by the data signal analyzer 26 is again calculated and set as a new error power value P1. In query step 414, this new error power value P1 is compared with the error power value P0 most recently stored in step 411. If P1<P0 (the answer to query step 414 is NO), it is inferred that the further increase in tap value does not reduce the error, and the routine transitions to step 415, wherein the value of the tap is decremented back to its immediately previous value, as an optimized tap value, and the tap optimization routine exits to FIG. 3.

If the answer to query step 414 is YES (P1<P0), which implies that increasing the tap value reduces the error, the routine loops back to step 411, wherein the newly calculated error power value P1 is stored in place of the previously stored error power value P0, and the routine transitions to increment step 412, as described above. Eventually, once further incrementing of the tap value no longer produces a reduction in error power (i.e., the answer to query step 414 is again NO), the tap value is decremented back to its previous value as optimized, and the tap optimization routine exits to FIG. 3.

It should be noted that the error power sums calculated in the routine of FIG. 4 may be calculated over an arbitrary number of baud (although the number must be the same for each calculation). In most cases this number should exceed one-hundred. In addition, the sums need not be derived over contiguous baud, but may be accumulated over selected baud, as desired. Moreover, as described above, the parameters given here are for a practical commercial implementation, and have been demonstrated to provide a one to three dB improvement in error reduction. Increasing the number of filter taps (above n=4) has not been found to provide an improvement in radio performance sufficient to offset the associated increase in cost.

Once the tap optimization routine of FIG. 4 has been completed for a respective tap and exits to FIG. 3, the routine of FIG. 3 proceeds to increment the tap number to the next tap and again transition to the tap "n" optimization routine of FIG. 4. This process is sequentially performed in steps 304–307 for the remaining taps (3 and 4 in the present four tap example), until the weighting coefficients of all the filter taps have been optimized.

As will be appreciated from the foregoing description, by inserting a reduced complexity, iteratively adaptive FIR filter in the received signal processing path just upstream of a direct spread spectrum radio's despreading function, the present invention is able to improve the performance of conventional commercial spread-spectrum radio systems. Advantageously, the adaptive FIR filter of the invention is readily implemented with a relatively small number of taps, in which tap values of the filter are individually adaptively adjusted to optimized values by the radio's 20 control processor, so as to minimize the total (I and Q) power in the error in the data decisions performed by the radio's data signal analyzer.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. For use with a direct spread-spectrum radio receiver, in which a demodulated spread signal received by way of a radio transmission channel from another direct spreading radio is processed in accordance with a despreading, pseudo-random chip sequence produced by a pseudo random noise generator to produce despread signals, said despread signals being processed by a data signal analyzer to recover transmitted data, a method for compensating for signal degradation effects imparted by said radio channel and internal distortion of said another direct spreading radio and said radio receiver, said method comprising the steps of:

(a) filtering said demodulated spread signal by means of an iteratively adaptive multitap finite impulse response (FIR) filter, installed in said receiver upstream of a signal processing location of said direct spread-spectrum radio at which said demodulated spread signal is processed in accordance with said despreading, pseudo-random chip sequence to produce said despread signals; and (b) iteratively adjusting respective tap values of said multitap FIR filter to optimized values that effectively minimize the power in the error in data values produced by said data signal analyzer by setting the value of a selected tap of said multitap FIR filter to a fixed value, and iteratively adjusting tap values of remaining taps of said filter from initial settings to said optimized values, by iteratively adjusting the tap value of each of said remaining taps on. an individual tap basis, from an initial setting to an optimized value for that tap.

2. A method according to claim 1, wherein said fixed value of said selected tap is a maximum value, and each of said initial tap value settings is zero.

3. A method according to claim 1, wherein step (b) comprises, for each iterative adjustment of the value of a respective tap, calculating power in the error in data produced by said data signal analyzer and, in response to a reduction in the value of calculated error power from a previous value of calculated error power, performing a further iterative adjustment of said value of said respective tap.

4. A method according to claim 1, wherein step (b) comprises, for each iterative adjustment of the value of a respective tap, calculating power in the error in data produced by said data signal analyzer and, in response to no reduction in the value of calculated error power from a previous value of calculated error power, establishing said optimized value of said respective tap.

5. A filtering mechanism for a direct spread-spectrum radio receiver, in which a demodulated spread signal received by way of a radio transmission channel from another direct spreading radio is processed in accordance with a despreading, pseudo-random chip sequence produced by a pseudo random noise generator to produce despread signals, said despread signals being processed by a data signal analyzer to recover transmitted data, said filtering mechanism comprising:

an iteratively adaptive multitap finite impulse response (FIR) filter, installed in said receiver upstream of a signal processing location of said direct spread-spectrum radio at which said demodulated spread signal is processed in accordance with said despreading, pseudo-random chip sequence to produce said despread signals; and a control processor coupled to said data signal analyzer, and being operative to iteratively adjust respective tap values of said multitap FIR filter to optimized values that effectively minimize the power in the error in data values produced by said data signal analyzer, by setting the value of a selected tap of said multitap FIR filter to a fixed value, and iteratively adjusting tap values of remaining taps of said filter from initial settings to said optimized values, by interatively adjusting the tap value of each of said remaining taps on an individual tap basis, from an initial setting to an optimized value for that tap.

6. A filtering mechanism according to claim 5, wherein said fixed value of said selected tap is a maximum value, and each of said initial tap value settings is zero.

7. A filtering mechanism according to claim 5, wherein, for each iterative adjustment of the value of a respective tap, said control processor is operative to calculate power in the error in data produced by said data signal analyzer and, in response to a reduction in the value of calculated error power from a previous value of calculated error power, to further iteratively adjust said value of said respective tap.

8. A filtering mechanism according to claim 5, wherein, for each iterative adjustment of the value of a respective tap, said control processor is operative to calculate power in the error in data produced by said data signal analyzer and, in response to no reduction in the value of calculated error power from a previous value of calculated error power, establishing said optimized value of said respective tap.

9. A method of controlling the operation of a direct spread-spectrum radio receiver, in which a demodulated spread signal received by way of a radio transmission channel from another direct spreading radio is despread in accordance with a despreading, pseudo-random chip sequence to produce despread signals, said despread signals being processed by a data signal analyzer to recover transmitted data, said method comprising the steps of:

(a) compensating for signal degradation effects imparted by said radio channel and internal distortion of said another direct spreading radio and said radio receiver by filtering said demodulated spread signal through an iteratively adaptive multitap finite impulse response (FIR) filter installed in said receiver upstream of a signal processing location of said direct spread-spectrum radio at which said demodulated spread signal is despread; and (b) iteratively adjusting respective tap values of said multitap FIR filter to minimize error in data values produced by said data signal analyzer by iteratively adjusting respective tap values of said multitap FIR filter to optimized values that effectively minimize the power in the error in data values produced by said data signal analyzer, by setting the value of a selected tap of said multitap FIR filter to a fixed value, and iteratively adjusting tap values of remaining taps of said filter from initial settings to said optimized values.

10. A method according to claim 9, wherein said fixed value of said selected tap is a maximum value, and each of said initial tap value settings is zero.

11. A method according to claim 9, wherein step (b) comprises iteratively adjusting the tap value of each of said remaining taps on an individual tap basis, from an initial setting to an optimized value for that tap.

12. A method according to claim 11, wherein step (b) comprises, for each iterative adjustment of the value of a respective tap, calculating power in the error in data produced by said data signal analyzer and, in response to a reduction in the value of calculated error power from a previous value of calculated error power, performing a further iterative adjustment of said value of said respective tap.

13. A method according to claim 11, wherein step (b) comprises, for each iterative adjustment of the value of a respective tap, calculating power in the error in data produced by said data signal analyzer and, in response to no reduction in the value of calculated error power from a previous value of calculated error power, establishing said optimized value of said respective tap.

* * * * *